W. V. TURNER.
FLUID PRESSURE BRAKE APPARATUS.
APPLICATION FILED JAN. 5, 1909.
1,108,280.
Patented Aug. 25, 1914.
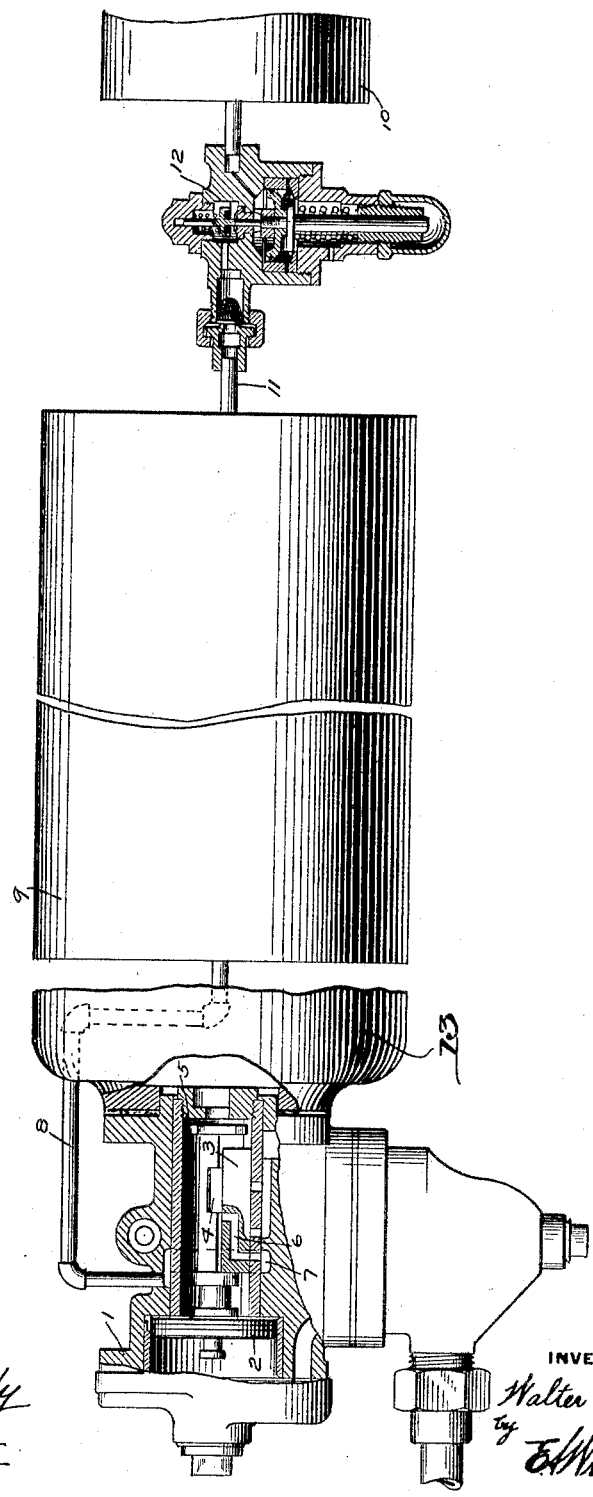
WITNESSES
INVENTOR
Walter V. Turner

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF PITTSBURGH, PENNSYLVANIA, A CORPORATION OF PENNSYLVANIA.

FLUID-PRESSURE-BRAKE APPARATUS.

1,108,280.   Specification of Letters Patent.   Patented Aug. 25, 1914.

Application filed January 5, 1909.  Serial No. 470,792.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure-Brake Apparatus, of which the following is a specification.

This invention relates to car air brake equipment in which means are provided for supplying air to apparatus other than the brakes, and more especially to apparatus employed for the distribution of water on a car. The present invention is also in the nature of an improvement on the construction covered in Patent No. 1,025,340, dated May 7, 1912. According to the construction disclosed in this prior application, a storage reservoir is provided from which fluid under pressure is supplied to the water distribution or other apparatus, said reservoir being charged from the auxiliary reservoir on the car. A valve mechanism is interposed in the supply pipe leading from the auxiliary reservoir to the storage reservoir, which is adapted to open communication through the supply pipe only when the auxiliary reservoir pressure is above a certain predetermined degree of pressure, so that the auxiliary reservoir is enabled to charge up to a degree insuring the proper action of the brakes before any air is permitted to flow to the other apparatus.

In certain improved forms of brakes now in use, the ordinary standard pressure of 70 pounds is employed at times and a higher pressure of say 110 pounds is used at other times with the same equipment. When the brakes are operating at the higher pressure of 110 pounds, it will be evident that the valve mechanism which controls communication between the auxiliary reservoir and the storage reservoir for the water distribution apparatus, being adjusted to a degree less than the ordinary standard pressure of 70 pounds, for instance, 60 pounds, permits the free flow of air through the supply pipe at all pressures above 60 pounds and thus there is a possibility when the higher braking pressure of 110 pounds is in service that the auxiliary reservoir will not be charged up to a sufficient degree, so as to move the triple piston out from the release position upon an ordinary reduction in train pipe pressure in making an application of the brakes or even if the triple piston should move out, it may again return toward release position by reason of the continued flow of air from the auxiliary reservoir to the storage reservoir of the water distribution apparatus and the then higher pressure on the train pipe side of the triple piston. This difficulty is overcome in the above mentioned application by connecting the supply pipe for the water distribution apparatus to a port controlled by the main slide valve to the triple valve. When the triple valve is in the normal release position, the port is open to the auxiliary reservoir so that the storage reservoir may be charged up, but upon movement of the triple valve from release position the port is closed, so that further flow of air from the auxiliary reservoir to the storage reservoir is cut off.

My present improvement has reference more particularly to brake equipments, now extensively employed, in which a supplemental reservoir is provided for furnishing air in connection with certain braking operations, notably, for graduating the release of brakes and for obtaining a high pressure in an emergency application of the brakes.

The main feature of my invention contemplates the employment of this supplemental reservoir also as the storage reservoir for the air supply of the water distribution or other apparatus. By this construction the additional reservoir and the cut out valve mechanism is dispensed with, the latter for the reason that there is no additional reservoir to draw air from the auxiliary reservoir and thereby deplete its pressure.

In the accompanying drawing, the single figure illustrates a triple valve device having a supplemental reservoir connected up to supply air for apparatus other than the brakes in accordance with my improvement.

The triple valve device shown in the drawing is of the type employed for graduating the release of the brakes and comprises a casing 1 containing triple valve piston 2 for operating the main slide valve 3 and the graduating valve 4, which are contained in the usual valve chamber 5 opening into the auxiliary reservoir 13, shown in part. In addition to the usual triple valve ports, the main slide valve is provided with a through port 6 controlled by the graduating valve 4, and the main slide valve seat is provided with a port opening 7 of pipe 8 leading to the supplemental reservoir 9. In normal release position, the port 6 is uncovered by the graduating valve 4 and registers with port opening 7, so that when air is supplied to the train pipe the supplemental reservoir is charged up to the pressure carried in the system by flow of air around the triple valve piston to the valve chamber 5.

In making an application of the brakes the first outward movement of the triple valve piston 2 causes the graduating valve 4 to close the port 6, so that flow of air to the supplemental reservoir is cut off, and the fluid in the supplemental reservoir is retained. After the brakes are applied, to graduate the brakes off, a gradual increase in train pipe pressure is made so as to shift the triple valve piston to release position. The ports 6 and 7 being then brought into register air at the higher pressure stored in the supplemental reservoir is vented to the auxiliary reservoir thus increasing the pressure on the auxiliary reservoir side of the triple valve piston sufficiently to shift the parts outwardly from release position and cut off further exhaust of air from the brake cylinder. According to my improvement, this supplemental reservoir is connected directly to the water tank 10 of the water distribution system through a pipe 11 in which may be interposed a reducing valve 12 for the purpose of reducing the pressure of the fluid supplied to the water tank, the reducing valve being usually adjusted to about 20 pounds.

Though the supplemental reservoir is described herein as employed in connection with graduating the release of the brakes, it will be understood that the present invention contemplates employing the supplemental reservoir whether used for this or other purposes such as, for example, to obtain a high pressure in an emergency application of the brakes.

It will now be apparent that with the present improvement the additional reservoir as well as the cut out valve mechanism is dispensed with while retaining all the advantages of my prior construction.

Having now described my invention, what I claim as new and desire to secure by Letters Patent, is:—

1. The combination with a fluid pressure brake comprising a train pipe, triple valve, auxiliary reservoir, and a supplemental reservoir for supplying fluid to graduate the release of the brakes, of a receptacle from which fluid is supplied for purposes other than controlling the brakes, said supplemental reservoir being connected to and serving as the source of fluid supply for said receptacle.

2. The combination with a fluid pressure brake comprising a train pipe, triple valve, and auxiliary reservoir, of a supplemental reservoir from which fluid is supplied to the auxiliary reservoir side of the triple valve upon movement to release position and a pipe connected to said supplemental reservoir for supplying fluid for purposes other than controlling the brakes.

3. The combination with a fluid pressure brake comprising a train pipe, triple valve, and auxiliary reservoir, of a supplemental reservoir from which fluid is supplied to the auxiliary reservoir side of the triple valve upon movement to release position, a receptacle from which fluid is supplied for purposes other than controlling the brakes, a pipe connecting said supplemental reservoir with said receptacle, and a pressure reducing valve device in said pipe for limiting the pressure of fluid supplied from the supplemental reservoir to said receptacle.

4. The combination with a triple valve, brake cylinder, and auxiliary reservoir, of a receptacle from which fluid is taken for purposes other than controlling the brakes and a single reservoir having connections to serve as the usual supplemental reservoir for graduating the release of the brakes and also as the direct source of fluid pressure for said receptacle.

In testimony whereof I have hereunto set my hand.

WALTER V. TURNER.

Witnesses:
  Wm. M. Cady,
  A. M. Clements.